US008321783B2

(12) United States Patent
Dupuis-Latour et al.

(10) Patent No.: US 8,321,783 B2
(45) Date of Patent: Nov. 27, 2012

(54) VISUALIZING CONTENT POSITIONING WITHIN A DOCUMENT USING LAYERS

(75) Inventors: Dimitri Dupuis-Latour, Paris (FR); Pierre JY Frisch, Vancouver (CA); Francois M. Jouaux, Woodside, CA (US); Gilles Drieu, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 745 days.

(21) Appl. No.: 12/241,289

(22) Filed: Sep. 30, 2008

(65) Prior Publication Data
US 2010/0083096 A1    Apr. 1, 2010

(51) Int. Cl.
*G06N 3/00* (2006.01)
(52) U.S. Cl. ........................................ 715/243
(58) Field of Classification Search .................. 715/234, 715/243, 254, 255, 766, 231
See application file for complete search history.

(56) References Cited

U.S. PATENT DOCUMENTS

| 7,598,952 | B1 * | 10/2009 | O'Donnell | 345/426 |
|---|---|---|---|---|
| 7,656,543 | B2 * | 2/2010 | Atkins | 358/1.13 |
| 2007/0070066 | A1 * | 3/2007 | Bakhash | 345/419 |
| 2007/0208994 | A1 * | 9/2007 | Reddel et al. | 715/512 |
| 2009/0083338 | A1 * | 3/2009 | Evans et al. | 707/201 |

OTHER PUBLICATIONS

"Adobe Illustrator CS: Classroom in a Book," Adobe, 2004, pp. 169-192.*
Adobe Systems Incorporated, "Using Adobe Dreamweaver CS4—Chapter 6: Creating pages with CSS—Working with div tags", 2008, pp. i-vi and 168-171, [online] [Retrieved on Dec. 16, 2008] Retrieved from the internet <URL:http://help.adobe.com/en_US/Dreamweaver/10.0_Using/dreamweaver_cs4_help.pdf>.
Bos, B., et al., "Cascading Style Sheets Level 2 Revision 1 (CSS 2.1) Specification—Chapter 9: Visual formatting model" (W3C Candidate Recommendation), Jul. 19, 2007, [online] [Retrieved on Dec. 16, 2008] Retrieved from the internet <URL:http://www.w3.org/TR/CSS21/visuren.html>.
Grosvenor, S., "Flash Interface Design Made Simple," Jul. 1, 2004, [online] [Retrieved on Dec. 16, 2008] Retrieved from the internet <URL:http://www.sitepoint.com/print/flash-interface-design/>.
Hyatt, D., et al., "CSS Transforms" (WebKit Open Source Project specification proposal), Sep. 4, 2008, [online] [Retrieved on Dec. 16, 2008] Retrieved from the internet <URL:http://webkit.org/specs/CSSVisualEffects/CSSTransforms.html>.
Li, W., et al., "Interactive Image-Based Exploded View Diagrams," Proceedings: Graphics Interface, London, Ontario, May 17-19, 2004, [online] [Retrieved on Dec. 16, 2008] Retrieved from the internet <URL: http://grail.cs.washington.edu/projects/exview/pubs/wilmotli04exview.pdf>.

* cited by examiner

*Primary Examiner* — Kyle Stork
(74) *Attorney, Agent, or Firm* — Fish & Richardson P.C.

(57) ABSTRACT

It can be difficult to predict what the layout of a document will be if the document contains several content elements, some of which are associated with different positioning schemes. In one embodiment, elements are shown in different layers based on their positioning schemes. For example, a first layer includes elements that are associated with non-overlapping positioning schemes, and a second layer includes elements that are associated with overlapping positioning schemes. When the document is viewed from above, the layers "collapse" onto each other, and the document appears to have a conventional (two-dimensional) page rendering. However, when the document is viewed from an angle, the layers appear separately in three-dimensional space, similar to an exploded view. The separate layers reveal the positioning schemes of the various elements and the layout interactions between those elements. This visualization technique helps a user understand how various elements are positioned within the document.

20 Claims, 16 Drawing Sheets

VISUALIZING CONTENT POSITIONING WITHIN A DOCUMENT USING LAYERS

BACKGROUND

1. Field of Invention

The present invention relates generally to graphical user interfaces and more specifically to visualizing how content is positioned within a document.

2. Background of Invention

A document is comprised of one or more elements, such as text and objects. A portion of text is made of individual characters. Objects include, for example, images, containers, charts, and tables.

Elements can be nested within each other. An element that is nested within another element is referred to as a "child element." An element within which another element is nested is referred to as a "parent element." In other words, a child element is nested within a parent element. Since elements can be nested, they can form a hierarchy of elements. When a document comprises nested elements, the element hierarchy is referred to as a "document tree."

The element that contains all of the other elements in the hierarchy is referred to as the "root element." The root element does not have a parent element. All other elements in the hierarchy are child elements, and each one has exactly one parent element. All child elements have at least one "ancestor element," which refers to the child element's parent element, grandparent element (if any), great-grandparent element (if any), etc., until the root element is reached.

If a parent element contains multiple child elements, the child elements are referred to as "sibling elements." Sibling elements can be ordered so that each sibling element has a "previous" sibling element and a "next" sibling element (except for the first sibling, which has no previous sibling, and the last sibling, which has no next sibling).

When a document is rendered, each element of the document is positioned somewhere within a two-dimensional area (referred to as a "page"). A page can exist in various forms such as a graphical user interface window (e.g., if the document is rendered using a display device such as a monitor) or a sheet of paper (e.g., if the document is rendered using a printer). The positions of the elements are collectively referred to as the "layout" of the document.

Elements are positioned on a page according to one or more "positioning schemes." A positioning scheme is a set of rules that defines how an element should be positioned on a page. Since each element can be assigned only one position on a page, each element is associated with exactly one positioning scheme. If a document comprises multiple elements, each element can be associated with a different positioning scheme.

When working with a document, it can be difficult to predict what the layout will be if there are several elements, some of which are associated with different positioning schemes.

SUMMARY OF INVENTION

When working with a document, it can be difficult to predict what the layout will be if there are several elements, some of which are associated with different positioning schemes. One possibility is to show multiple "views" of the document, one view for each positioning scheme. In each view, only the elements that were associated with that positioning scheme would be shown. The division of the document into multiple views makes it difficult to show interactions (such as overlaps) between elements associated with different positioning schemes, since these elements would be shown in different views. The multiple views also make it difficult to conceptualize the document's eventual representation when it is rendered on a page.

In one embodiment, elements are shown in different layers (rather than in different views) based on their positioning schemes. For example, a first layer includes content elements that are flow-positioned, and a second layer includes content elements that are absolute-positioned. When the document is viewed from above, the layers "collapse" onto each other, and the document appears to have a conventional (two-dimensional or "2D") page rendering (referred to as a "conventional representation"). However, when the document is viewed from an angle, the layers appear separately in three-dimensional ("3D") space, similar to an exploded view (referred to as a "layered representation"). The separate layers reveal the positioning schemes of the various elements and the layout interactions between those elements. This visualization technique enables a user to better understand how various content elements are positioned within the document.

In one embodiment, a layered representation of a document also includes a "placeholder." A placeholder indicates a 2D area on a lower layer that will be overlapped by an element on a higher layer when a document is viewed with a conventional representation. In one embodiment, a placeholder has the same shape and size as the element it represents. A placeholder can be shown in various ways. For example, it can be shown in gray as if it were a shadow cast upon the lower layer by the element in the upper layer. As another example, a placeholder can look like its associated element except that the placeholder has a different opacity (e.g., the placeholder is semitransparent so that any overlapped elements can still be seen). As yet another example, the placeholder can be represented by a symbol such as an anchor, a cross, crosshairs, or a pin.

In one embodiment, a layered representation of a document also includes a "cross-layer connection." A cross-layer connection indicates a correspondence between a placeholder on a lower layer and an element on a higher layer. A cross-layer connection can be shown in various ways. For example, it can be shown as a line that connects the upper-left corner of the placeholder to the upper-left corner of the element. As another example, a cross-layer connection can be shown in ways where a line is not necessary. For example, if a placeholder is selected, the corresponding element can be visually indicated (and vice versa—if an element is selected, the corresponding placeholder can be visually indicated). As another example, if a cursor hovers within a placeholder, the corresponding element can be visually indicated (and vice versa—if a cursor hovers within an element, the corresponding placeholder can be visually indicated). Visual indication of an object can include, for example, highlighting the object, changing a color of the object, animating the object (e.g., so that the object appears to shake or quiver), or surrounding the object with a shape (e.g., an oval).

Figure 1:
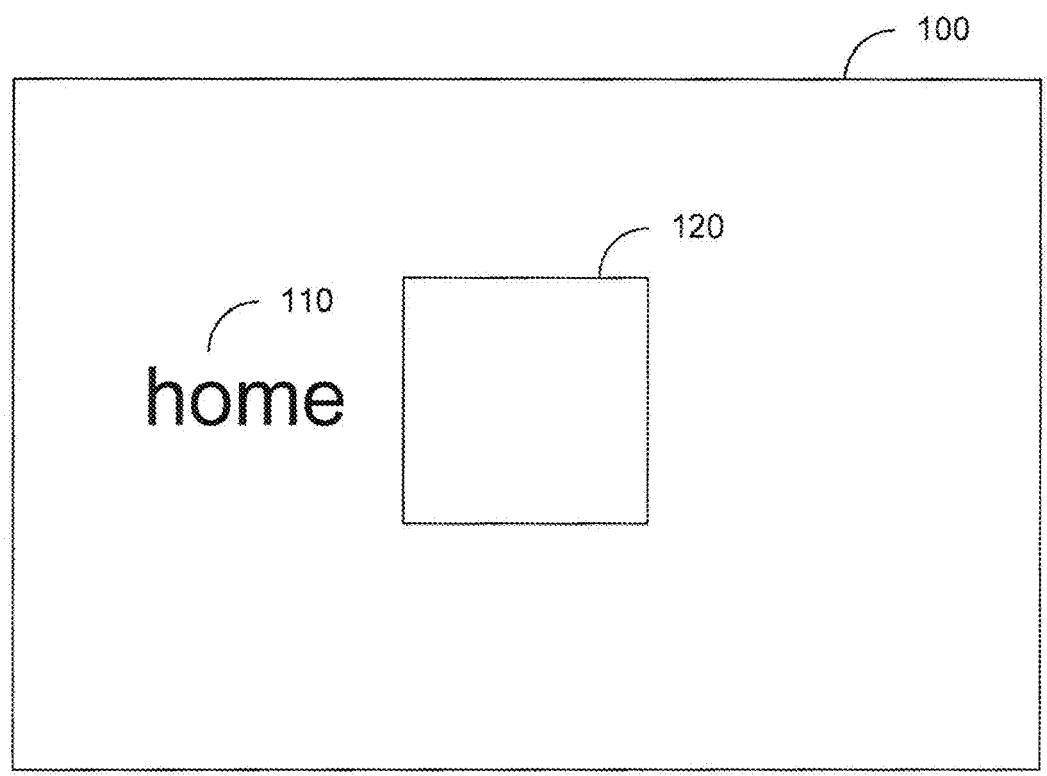
FIG. 1 shows a representation of a document that includes "home" text followed by an object.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Positioning Schemes

Elements are positioned on a page according to one or more "positioning schemes." A positioning scheme is a set of rules that defines how an element should be positioned on a page. Since each element can be assigned only one position on a page, each element is associated with exactly one positioning scheme. If a document comprises multiple elements, each element can be associated with a different positioning scheme.

Exemplary positioning schemes include flow positioning, float positioning, relative positioning, absolute positioning, and explicit flow positioning. Note that positioning schemes can be referred to by different names in different software applications. For example, one word processing program, such as Apple Pages®, might name its positioning schemes differently from another word processing program, such as Microsoft Word. Also, the word processing positioning scheme names might differ from the names used in Cascading Style Sheets (CSS), a style sheet language used to describe the presentation of a document written in a markup language. In this document, each positioning scheme has been assigned a name that attempts to reflect how the positioning scheme works, without regard to names used in particular software applications.

The exemplary positioning schemes (flow, float, relative, absolute, and explicit flow) fall into two groups. The first group is flow positioning and its variants (float positioning and relative positioning). The second group is absolute positioning and its variants (explicit flow positioning). Each positioning scheme will now be described.

Flow Positioning (and Variants)

Flow—In the flow positioning scheme, sibling elements are positioned one after the other so that they do not overlap. A particular flow positioning scheme specifies whether the next sibling element should be placed horizontally (left or right) or vertically (above or below) relative to the previous sibling element. For example, traditional Western layout for alphanumeric characters is to place elements horizontally (from left to right) and then vertically (from top to bottom). The effect is that after one horizontal line is completed, the next horizontal line is begun underneath the previous line.

In flow positioning, the position of a particular element depends on the position of the previous element, where "previous" refers to the sibling element (of the particular element) that was prior to the particular element in the sibling ordering. Since the position of a particular element depends on the position of the previous element, modifications to earlier elements can affect the positions of later elements. That is why a flow element's position is sometimes referred to as being "implicit."

If an element is flow-positioned, it cannot overlap sibling elements (by definition).

Figure 2A:
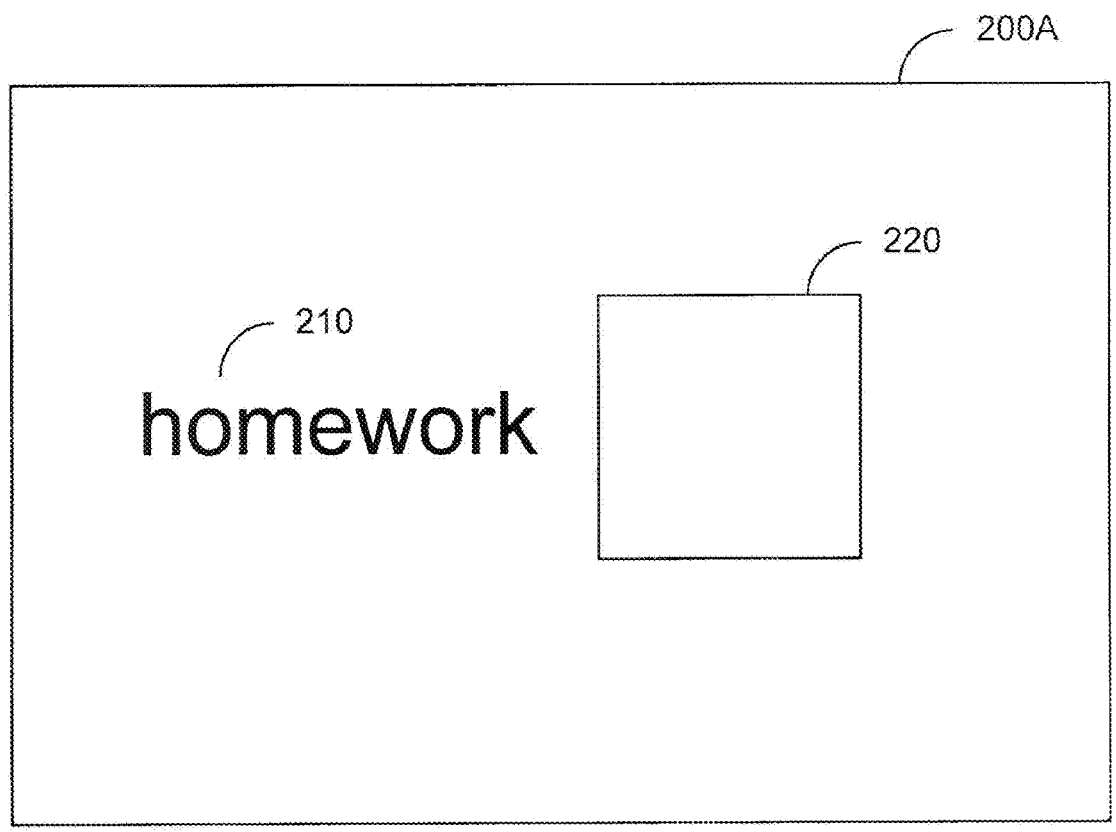
FIG. 2A shows a representation of a document that includes "homework" text followed by an object that was flow-positioned.

For example, consider a document that includes the text element "home" followed by an object. Initially, the object is placed on the page after (e.g., to the right of) the space used by the "home" text. FIG. 1 shows a representation 100 of a document that includes "home" text 110 followed by an object 120. Now, the "home" text is changed to "homework." If the object was specified as using flow positioning, then the object will still be placed on the page after the space used by the text. However, since the text changed from "home" to "homework," it requires more space. As a result, the object moves. FIG. 2A shows a representation 200A of a document that includes "homework" text 210 followed by an object 220 that was flow-positioned.

Float, Relative—The float positioning scheme and the relative positioning scheme are variants of the flow positioning scheme. In both the float positioning scheme and the relative positioning scheme, an element is initially positioned according to the flow positioning scheme to determine a temporary position. The element is then moved from the temporary position to a final position. The temporary position remains within the document flow and thus can change if the previous elements are modified. If the temporary position changes, then the final position can change also, since the final position is relative to the temporary position.

Float positioning and relative positioning differ regarding whether the element occupies space within the document flow at the temporary position and whether the element occupies space within the document flow at the final position. In float positioning, the element does not occupy space (within the document flow) at the temporary position. As a result, the sibling elements before and after the float element are positioned one after the other as if the float element did not exist between them. Also, the float element does occupy space (within the document flow) at the final position. Thus, if an element is float-positioned, it cannot overlap sibling elements. Another way to describe float positioning is that a float element's final position is within the document flow but is shifted within the line in which it is placed.

In relative positioning, the element does occupy space (within the document flow) at the temporary position. As a result, the sibling elements before and after the relative element are separated by a space that is equal in shape and size to the relative element. Also, the relative element does not occupy space (within the document flow) at the final position. Thus, if an element is relative-positioned, it can overlap sibling elements.

Absolute Positioning (and Variants)

Absolute—In the absolute positioning scheme, an element is positioned relative to another element called the "containing block" (sometimes referred to as the "offset parent"). Each absolute-positioned element has exactly one containing block. How that containing block is defined depends on the particular implementation of the positioning scheme (e.g., Apple Pages® versus CSS). Each absolute-positioned element can define an offset that describes the position of an edge of the element with respect to an edge of the containing block (e.g., the top edge, bottom edge, left edge, or right edge).

Up to four offset values can be defined—one per edge. An offset value can be positive, negative, or zero. The meaning of an offset value depends on the location of the origin (0,0) of the offset coordinate system defined relative to the containing block. The origin can be located anywhere. For example, the upper-left corner of a containing block can be defined as the origin. Then, positive offsets relative to the left edge of the containing block can be defined as being located to the right of the left edge of the containing block, while negative offsets relative to the left edge of the containing block can be defined as being located to the left of the left edge of the containing block. Similarly, positive offsets relative to the right edge of the containing block can be defined as being located to the left of the right edge of the containing block, while negative offsets relative to the right edge of the containing block can be defined as being located to the right of the right edge of the containing block. These left and right offset definitions are used in, for example, the Cascading Style Sheets Level 2 Revision 1 (CSS 2.1) Specification (see Chapter 9: Visual formatting model, Section 3: Positioning Schemes, Subsection 2: Box offsets: 'top', 'right', 'bottom', 'left').

It is possible for the offsets to be inconsistent with each other. For example, consider an element and a containing block that are both are defined as being 100 pixels wide. If the left edge offset is +10 pixels and the right edge offset is +10 pixels, then the element's width (when rendered) cannot be 100 pixels. One solution is to maintain the element's size and use only the left edge offset or only the right edge offset. Another possibility is to scale the element's size. How this inconsistency is resolved depends on the implementation of the positioning scheme.

Recall that in flow positioning, the position of a particular element is based on the position of the previous sibling element. Absolute positioning is different because the position of a particular element is independent of the position of the previous sibling element. That is why an absolute element's position is sometimes referred to as being "explicit."

If an absolute-positioned element is located in the same place on the page as another element, which element appears on top of the other is implementation specific and can sometimes be controlled (e.g., by setting a property).

Figure 2B:
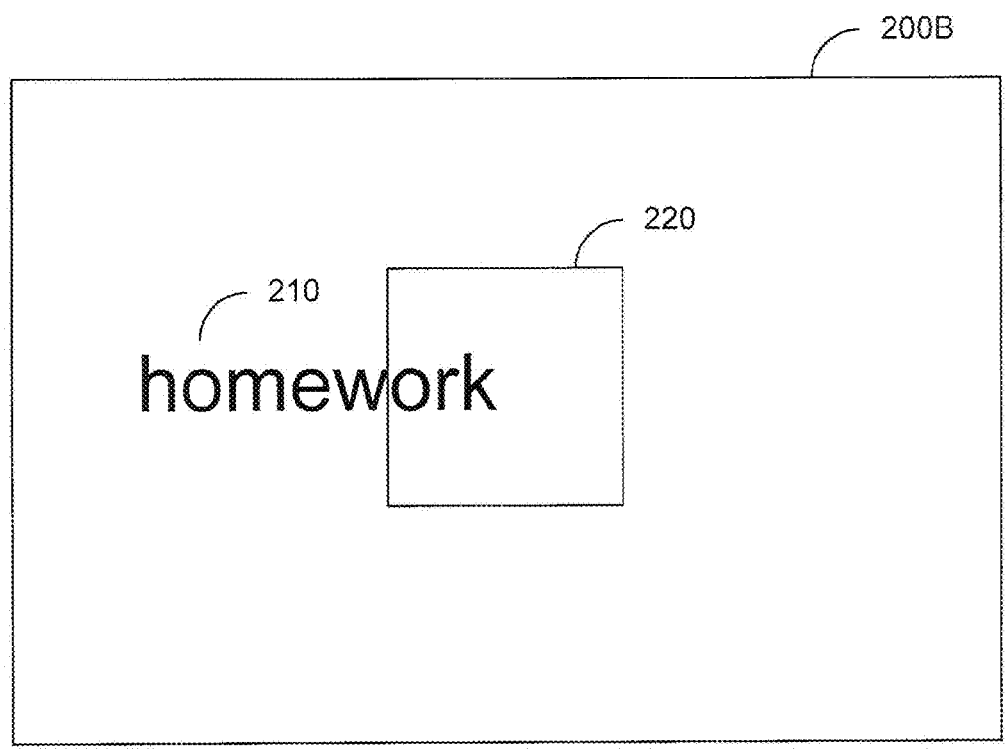
FIG. 2B shows a representation of a document that includes "homework" text followed by an object that was absolute-positioned.

For example, consider a document that includes the text element "home" followed by an object. Initially, the object is placed on the page after (e.g., to the right of) the space used by the "home" text. FIG. 1 shows a representation 100 of a document that includes "home" text 110 followed by an object 120. Now, the "home" text is changed to "homework." If the object was specified as using absolute positioning, then the object will not move. However, since the text changed from "home" to "homework," it requires more space. In this situation, if the object 120 was close to the "home" text 110, then the "homework" text might extend beyond the left edge of the object. As a result, the object and a portion of the text will occupy the same location on the page. FIG. 2B shows a representation 200B of a document that includes "homework" text 210 followed by an object 220 that was absolute-positioned. Note that a portion of the text 210 overlaps the object 220.

Explicit Flow—The explicit flow positioning scheme is a variant of the absolute positioning scheme. Similar to the absolute scheme, in the explicit flow scheme, an element is positioned relative to its containing block. However, in the explicit flow scheme, the element remains in the document flow. As a consequence, the explicit flow-positioned element affects the position of its sibling elements and cannot overlap them. The sibling elements can flow along the sides of the explicit flow-positioned element (left side, right side, both sides, or neither side).

Visualizing Positioning Using Layers

When working with a document, it can be difficult to predict what the layout will be if there are several elements, some of which are associated with different positioning schemes. One possibility is to show multiple "views" of the document, one view for each positioning scheme. In each view, only the elements that were associated with that positioning scheme would be shown. The division of the document into multiple views makes it difficult to show interactions (such as overlaps) between elements associated with different positioning schemes, since these elements would be shown in different views. The multiple views also make it difficult to conceptualize the document's eventual representation when it is rendered on a page.

In one embodiment, elements are shown in different layers (rather than in different views) based on their positioning schemes. For example, a first layer includes content elements that are flow-positioned, and a second layer includes content elements that are absolute-positioned. When the document is viewed from above, the layers "collapse" onto each other, and the document appears to have a conventional (two-dimensional or "2D") page rendering (referred to as a "conventional representation"). However, when the document is viewed from an angle, the layers appear separately in three-dimensional ("3D") space, similar to an exploded view (referred to as a "layered representation"). The separate layers reveal the positioning schemes of the various elements and the layout interactions between those elements. This visualization technique enables a user to better understand how various content elements are positioned within the document.

In one embodiment, a user can toggle between viewing a document with a conventional representation and viewing the same document with a layered representation. The toggle can be invoked in a variety of ways using a variety of user input devices. For example, the user can press a key on a keyboard, activate a button on a mouse, speak a command into a microphone, or touch an area of a touch-sensitive display.

An algorithm used in generating a document's layered representation will now be described. Afterwards, exemplary documents will be discussed (along with their conventional representations and layered representations) for each of the positioning schemes described above.

Algorithm Used in Generating a Layered Representation

An algorithm is used in generating a document's layered representation. The algorithm takes as input a set of elements (e.g., the elements contained in a document) and, for each element, an associated positioning scheme. The elements can be nested within each other to form an element hierarchy. The algorithm outputs, for each element, a corresponding layer in which the element should be shown.

For example, assume that each layer is identified by an index number, referred to as "Z" (named for the z-axis that is oriented perpendicularly to a two-dimensional page). The initial layer has a Z value of 0, the next layer has a Z value of 1, and so on. The algorithm determines, for each element, a corresponding Z value that indicates which layer should contain the element. As a by-product, the algorithm also determines the total number of layers in the layered representation.

Note that a layer does not necessarily correspond to a particular positioning scheme. For example, there is not necessarily one layer (e.g., one Z value) associated with all flow-positioned elements, one layer associated with all relative-positioned elements, and one layer associated with all explicit flow-positioned elements. Given an element, its corresponding Z layer depends on both the element's positioning scheme and the element's place within the element hierarchy. As a result, any number of layers is possible depending on the relationships between elements (e.g., their hierarchy) and their associated positioning schemes. Also, a layer can contain any number of elements.

The algorithm makes use of a distinction between a "non-overlapping positioning scheme" (NOPS) and an "overlapping positioning scheme" (OPS). An element that is associated with a NOPS cannot overlap (i.e., occupy the same 2D page position as) sibling elements. Examples of NOPSs include the flow positioning scheme, the float positioning scheme, and the explicit flow positioning scheme. An element that is associated with an OPS can overlap (i.e., occupy the same 2D page position as) sibling elements. Examples of OPSs include the absolute positioning scheme and the relative positioning scheme.

A layered representation of a document includes one or more layers, each of which contains one or more elements. In general, the initial layer (Z=0) corresponds to the root element of the document and any child elements of the root element that are associated with a NOPS (and possibly additional elements, as will be described later). Thus, the initial layer would include the root element and any of its child NOPS elements (and possibly additional elements). The next layer (Z=1) corresponds to any child elements of the root element that are associated with an OPS (and possibly additional elements, as will be described later). Thus, this next layer would include any of the root element's child OPS elements (and possibly additional elements).

In general, each time an OPS element is encountered at a new level in the element hierarchy, a new layer is added to the layered representation. This new layer is used to contain the new-level OPS element so that the new-level OPS element can (possibly) occupy the same two-dimensional space as an element in a lower layer (e.g., a layer with a smaller Z value). Note that the element in the lower layer can be either a NOPS element or an OPS element.

Given a particular layer (e.g., a particular Z value), NOPS children of the current element are displayed on the same layer. OPS children, however, are displayed on a layer above the current layer (e.g., a layer with an incremented Z value) directly above the page (two-dimensional) position that they would have occupied on the current layer. Child elements of the NOPS children and OPS children are displayed recursively using the same rules.

Figure 3:
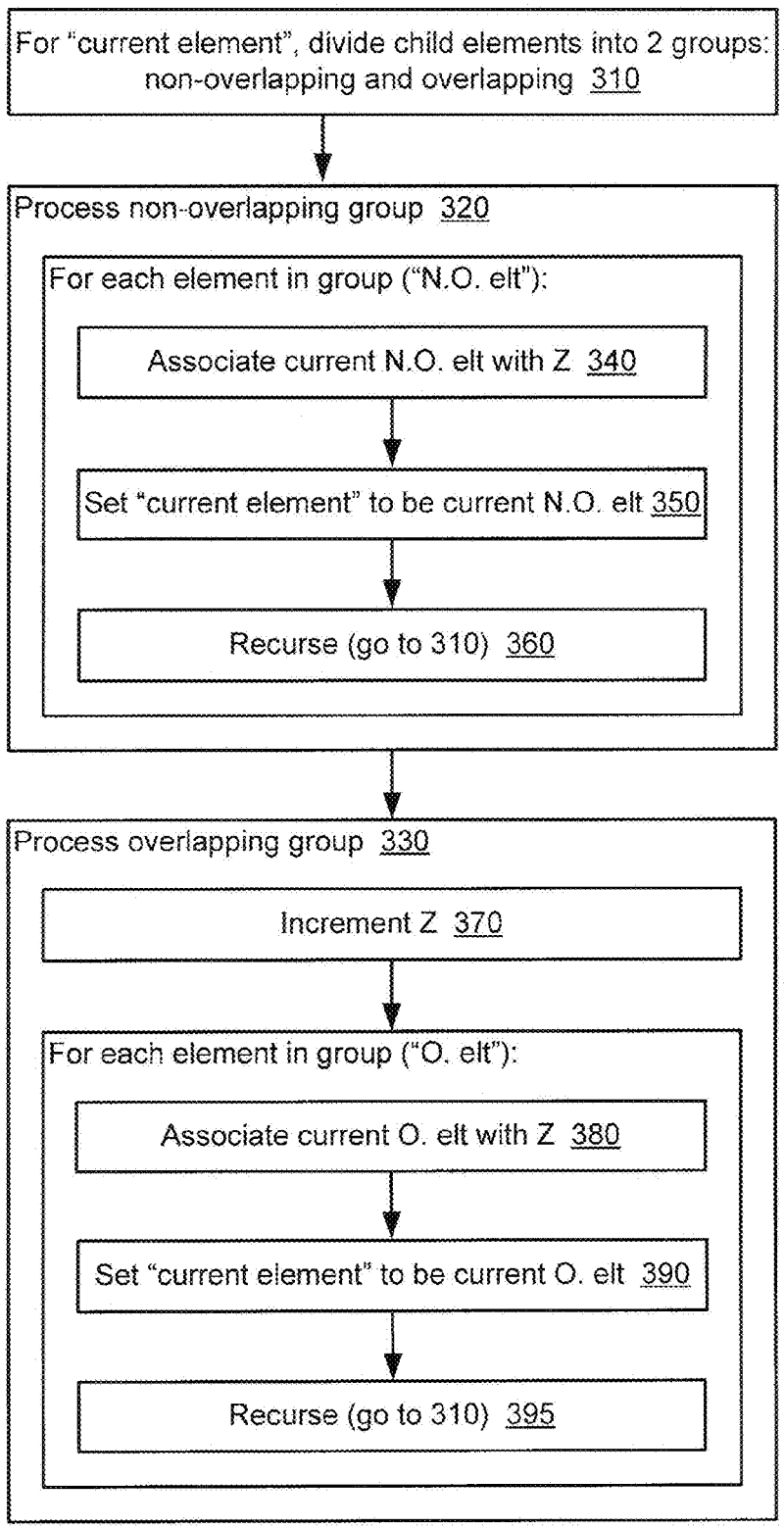
FIG. 3 shows a flowchart of a method for determining which element should be shown in which layer within a document's layered representation, according to one embodiment of the invention.

FIG. 3 shows a flowchart of a method for determining which element should be shown in which layer within a document's layered representation, according to one embodiment of the invention. Note that the method 300 illustrated in FIG. 3 determines a 3D location (i.e., Z value) for each element. The 2D location (i.e., x-y value within a layer) of each element is determined based on the element's positioning scheme, as is known by those having ordinary skill in the art.

Method 300 refers to a "current element" and "Z." When method 300 begins, the "current element" is set to the root element of an element hierarchy (e.g., the root element of a document tree) and the value of "Z" is zero.

In step 310, the child elements of the current element are divided into two groups: non-overlapping and overlapping. A child element that is associated with a non-overlapping positioning scheme (NOPS) is placed in the non-overlapping group. A child element that is associated with an overlapping positioning scheme (OPS) is placed in the overlapping group.

The non-overlapping group is processed 320. For each element in the non-overlapping group (referred to as an "N.O. elt"), the following steps are performed: The current N.O. elt is associated 340 with Z (i.e., the current N.O. elt will be displayed in the layer having an index value of Z). "Current element" is set 350 to the current N.O. elt. Method 300 starts again (recursion 360).

The overlapping group is processed 330. Z is incremented 370. For each element in the overlapping group (referred to as an "O. elt"), the following steps are performed: The current O. elt is associated 380 with Z (i.e., the current O. elt will be displayed in the layer having an index value of Z). "Current element" is set 390 to the current O. elt. Method 300 starts again (recursion 395).

The following pseudo-code represents an algorithm for displaying elements of a document in various layers:

```
//definition of the procedure "displayElement_StartingAtZPosition"
procedure displayElement_StartingAtZPosition(Element currentElement,
Number
currentZPosition){
let C1 be the set of currentElement's NO-OPS children.
let C2 be the set of currentElement's OPS children.
display currentElement at currentZPosition, with x and y obeying
currentElement's positioning scheme.
for every children element c1 in C1{
        display c1 at z = currentZPosition, with x and y position
        obeying c1's positioning scheme.
        perform procedure displayElement_StartingAtZPosition-
        (c1, currentZPosition).
        }
if C2 has more than zero elements{
        increment currentZPosition.
        for every children element c2 in C2{
                display c2 at z = currentZPosition, with x and y position
                obeying c2's positioning scheme.
                    perform procedure displayElement_StartingAtZPosition
                    (c2, currentZPosition).
                }
        }
}
//operation
let E be the document's root element.
let Z be 0.
perform procedure displayElement_StartingAtZPosition(E, Z).
```

Example Documents for Various Positioning Schemes

Exemplary documents will now be discussed (along with their conventional representations and layered representations) for each of the positioning schemes described above. When the schemes were introduced, they were discussed in the following order: flow (and its variants, float and relative) and absolute (and its variant, explicit flow). Since the algorithm described above distinguishes between a "non-overlapping positioning scheme" (NOPS) and an "overlapping positioning scheme" (OPS), the positioning schemes will now be discussed in a different order: NOPS (flow, float, and explicit flow) and OPS (absolute and relative).

Each of the following figures shows four elements: A (numbered as x20; e.g., 320), B (numbered as x30; e.g., 330), C (numbered as x10; e.g., 310), and text. Elements A and B and the text are flow-positioned using traditional Western layout (left to right, then top to bottom). The element illustrated as C differs in its positioning scheme depending on the Figure. Also, the elements A (x20), B (x30), and C (x10) and the text are sibling elements, where A is the first sibling, B is the second, C is the third, and the text is the last sibling. Thus, when these elements are positioned, element A is positioned first, followed by elements B and C and the text (in that order).

Non-Overlapping Positioning Schemes (NOPSs)

Figure 4A:
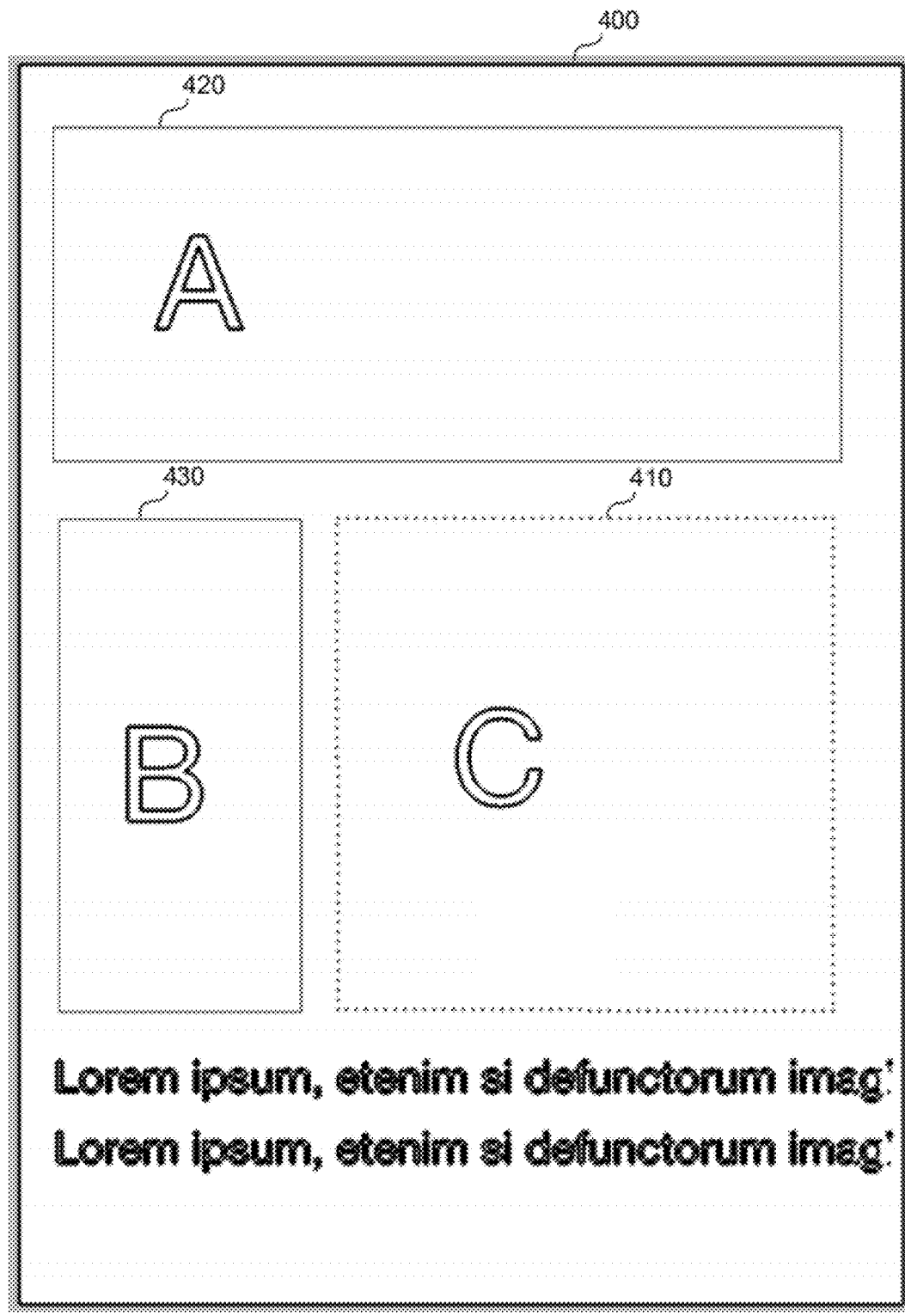
FIG. 4A shows a conventional representation of a document that includes a flow-positioned element.

Flow—FIG. 4A shows a conventional representation 400 of a document that includes a flow-positioned element 410. The document flow uses traditional Western layout (left to right, then top to bottom). Thus, element 420 is positioned starting at the upper left corner. Since element 420 fills that line, the next element (430) is positioned below element 420 and flush left. The next element (430) is positioned to the right of element 420, since space still remains on that line. Finally, the text is placed below element 430 flush left to begin a new line (since the previous line was full).

Figure 4B:
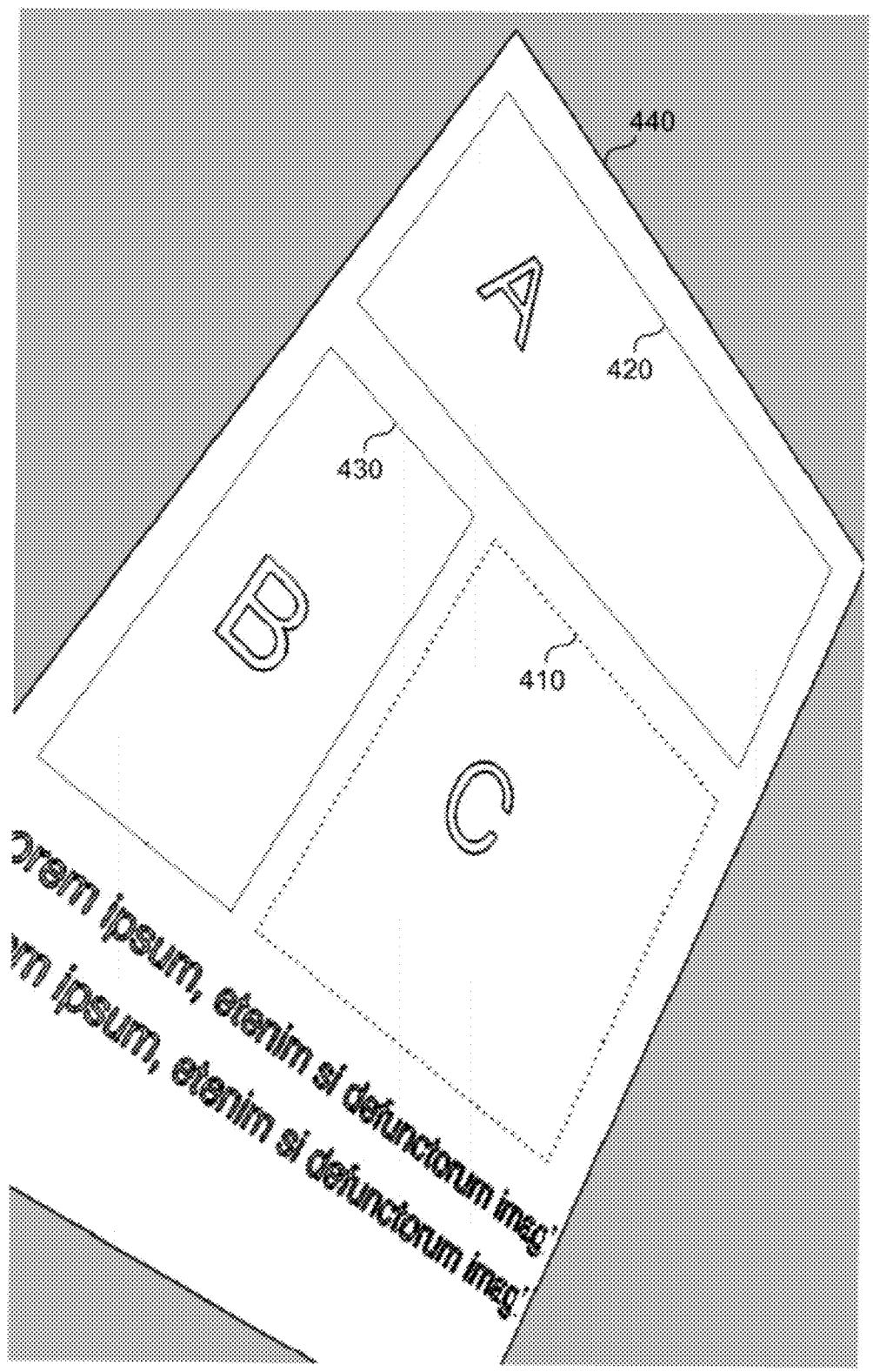
FIG. 4B shows a layered representation of the document shown in FIG. 4A, according to one embodiment of the invention.

FIG. 4B shows a layered representation of the document shown in FIG. 4A, according to one embodiment of the invention. FIG. 4B includes one layer 440. In one embodiment, the layer 440 is shown as if it were warped, in order to indicate a 3D perspective. For example, the layer 440 is shown as a parallelogram instead of as a rectangle. The layer 440 includes elements that are associated with a non-overlapping positioning scheme (NOPS). In FIG. 4B, the layer 440 includes elements 410, 420, and 430 because they are all flow-positioned.

Note that FIG. 4B includes only one layer 440. This is because all of the elements are associated with a NOPS and are not nested within any OPS containers. Since no element can overlap another element, there is no need for additional layers to demonstrate the overlap.

Figure 5A:
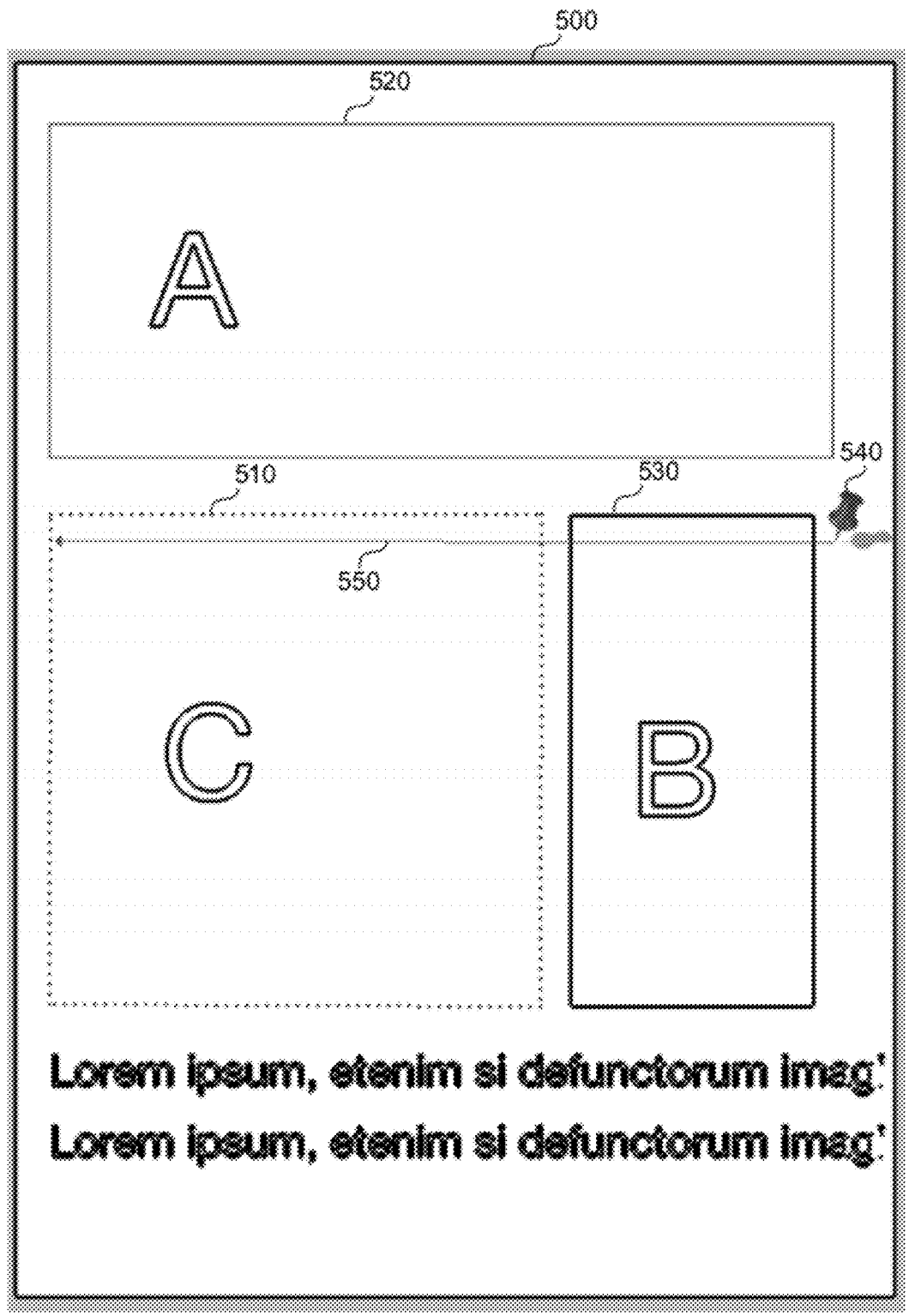
FIG. 5A shows a conventional representation of a document that includes a float-positioned element.

Float—FIG. 5A shows a conventional representation of a document 500 that includes a float-positioned element 510. Element 520 is positioned starting at the upper left corner. Since element 520 fills that line, the next element (530) is positioned below element 520 and flush left. There is adequate space to the right of element 530 to fit the next element (510). This "temporary position" is shown by the pin 540. Note that the point of the pin 540 occupies very little space, which conveys the fact that a float-positioned element does not occupy any space at its temporary position. Note also that the pin 540 is within the document flow. So, if element 530 were to be moved down one line, then the pin 540 would also be moved down one line.

Instead of placing element 510 to the right of element 530 (where the pin 540 is), element 510 is floated "left" along the line 550, which causes it to be placed flush left. As a result, element 510 is positioned to the left of element 530, and element 530 flows on the right side of element 510. Finally, the text is placed below element 510 flush left to begin a new line (since the previous line was full).

Figure 5B:
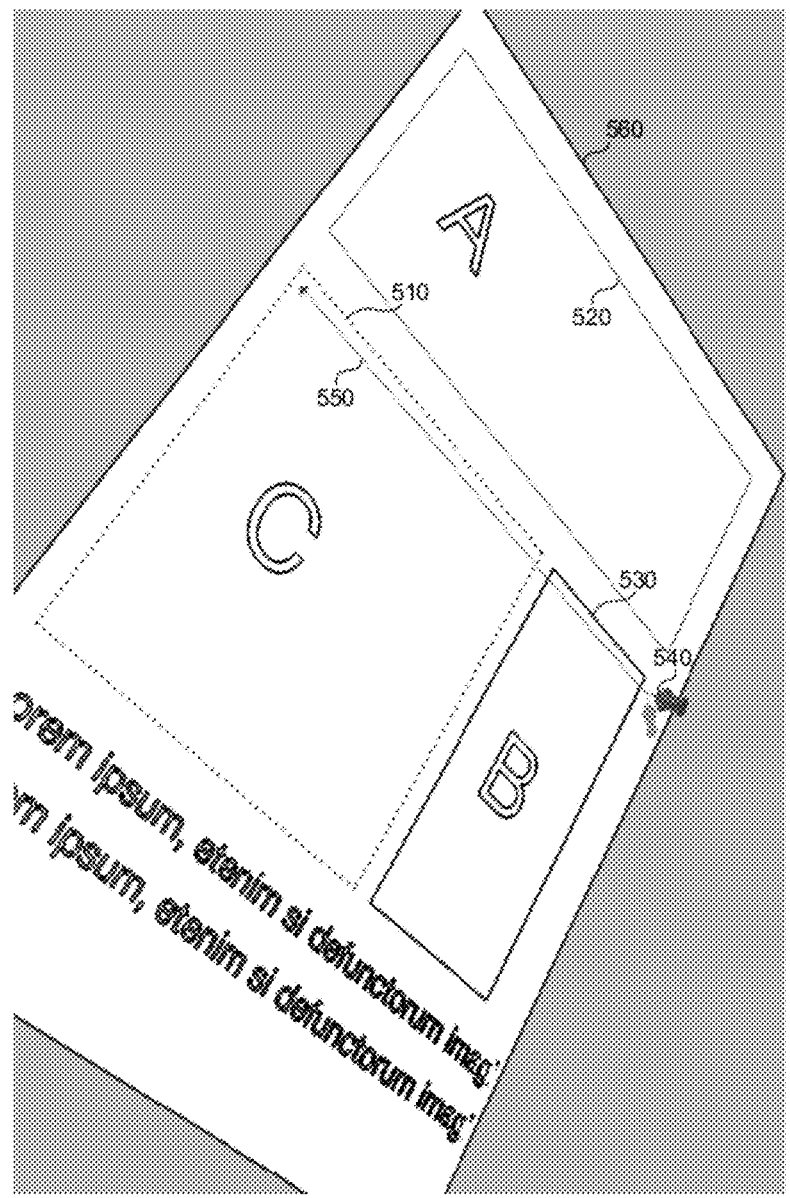
FIG. 5B shows a layered representation of the document shown in FIG. 5A, according to one embodiment of the invention.

FIG. 5B shows a layered representation of the document shown in FIG. 5A, according to one embodiment of the invention. FIG. 5B includes one layer 560. The layer 560 includes elements that are associated with a NOPS. In FIG. 5B, the layer 560 includes element 510 (because it is float-positioned) and elements 520 and 530 (because they are flow-positioned). FIG. 5B also shows the pin 540 and the line 550, which are used to explain the float positioning of element 510.

Note that FIG. 5B includes only one layer 540. This is because all of the elements are associated with a NOPS and are not nested within any OPS containers. Since no element can overlap another element, there is no need for additional layers to demonstrate the overlap.

Figure 6A:
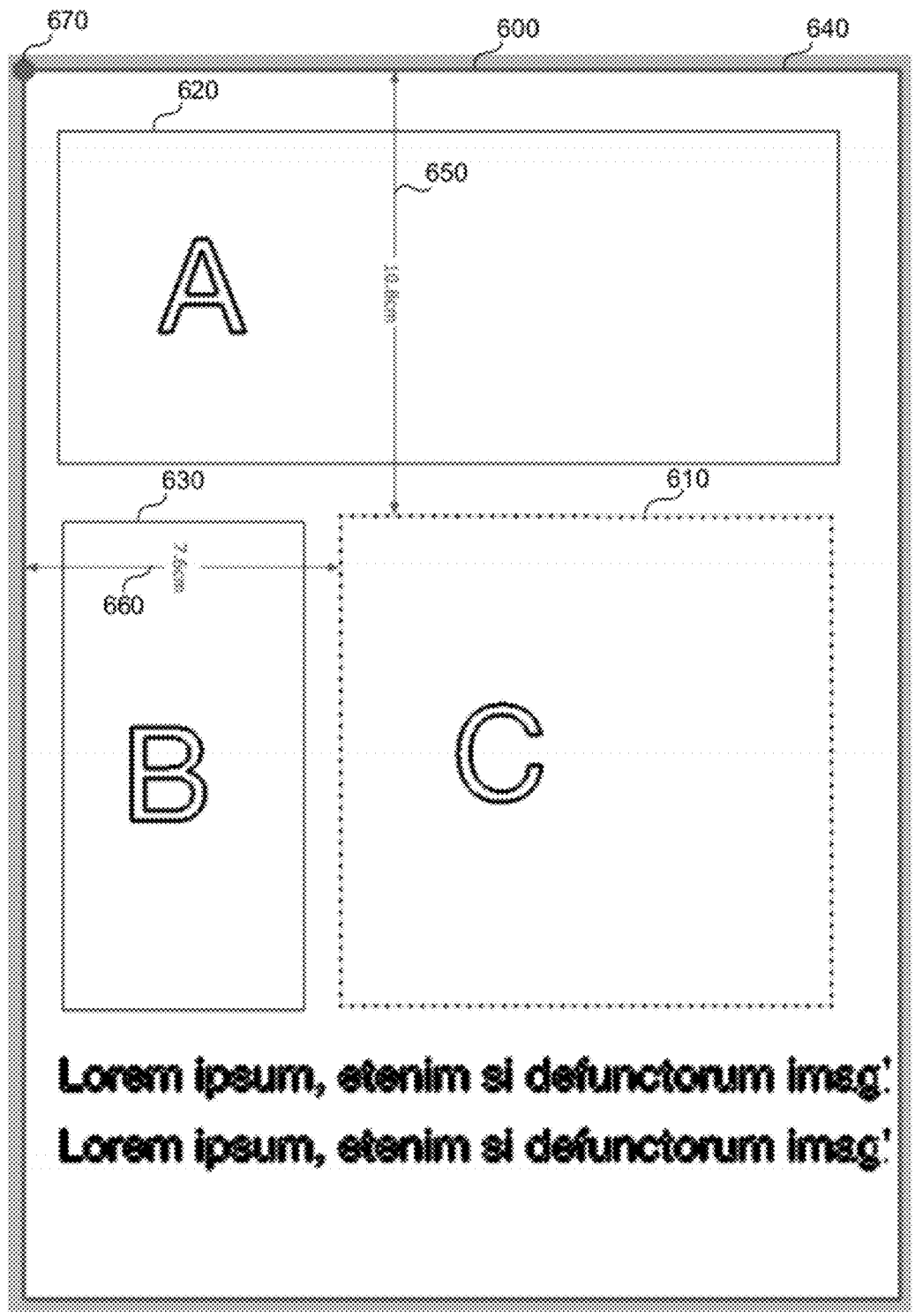
FIG. 6A shows a conventional representation of a document that includes an explicit flow-positioned element.

Explicit Flow—FIG. 6A shows a conventional representation of a document 600 that includes an explicit flow-positioned element 610. Recall that an explicit flow-positioned element is positioned relative to a containing block and can define an offset that describes the position of an edge of the element with respect to an edge of the containing block. In FIG. 6A, the containing block is the page itself. FIG. 6A shows the containing block 640 of element 610 and the top-edge offset 650 (here, 10.8 cm down) and left-edge offset 660 (here, 7.6 cm right) used to position the element 610. FIG. 6A also shows the upper-left corner 670 of the containing block 640, which is used as the origin (0,0) when measuring a vertical offset or horizontal offset. Note that the origin can be located anywhere with respect to the containing block (e.g., at a different corner of the containing block or in the center of the containing block). Also, the coordinate system can be defined differently with respect to which directions are indicated by positive offset values versus negative offset values.

In FIG. 6A (and FIG. 6B), element 610 is positioned first based on the containing block 640 and the offsets 650, 660. Element 620 is positioned starting at the upper left corner because of its traditional Western layout flow positioning and because enough space exists in that location. Since element 620 fills that line, the next element (630) is positioned below element 620 and flush left. Finally, the text is placed below element 630 flush left to begin a new line (since the previous line was full).

Figure 6B:
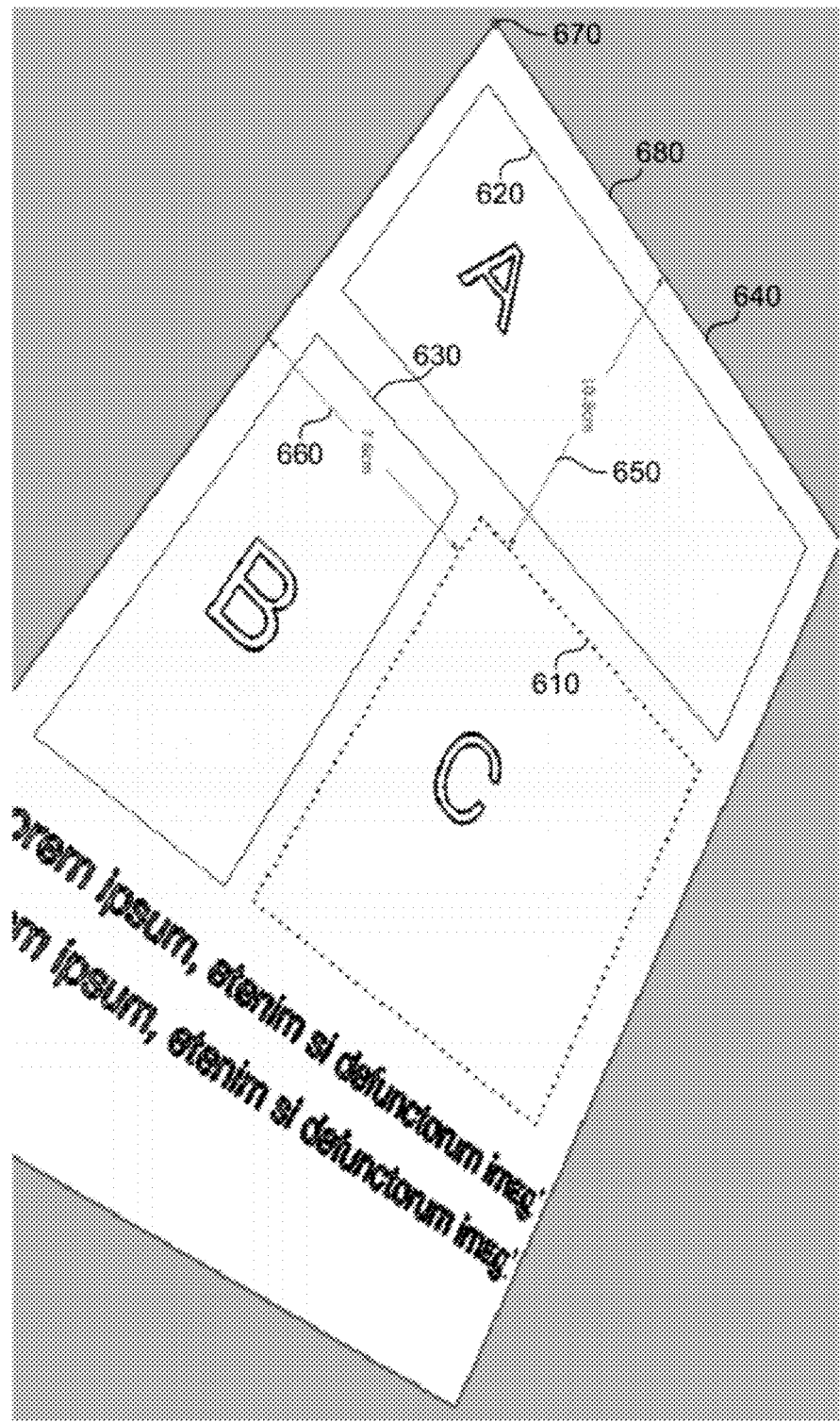
FIG. 6B shows a layered representation of the document shown in FIG. 6A, according to one embodiment of the invention.

FIG. 6B shows a layered representation of the document shown in FIG. 6A, according to one embodiment of the invention. FIG. 6B includes one layer 680. The layer 680 includes elements that are associated with a NOPS. In FIG. 6B, the layer 680 includes element 610 (because it is explicit flow-positioned) and elements 620 and 630 (because they are flow-positioned).

Note that FIG. 6B includes only one layer 640. This is because all of the elements are associated with a NOPS and are not nested within any OPS containers. Since no element can overlap another element, there is no need for additional layers to demonstrate the overlap.

Overlapping Positioning Schemes (OPSs)

Figure 7A:
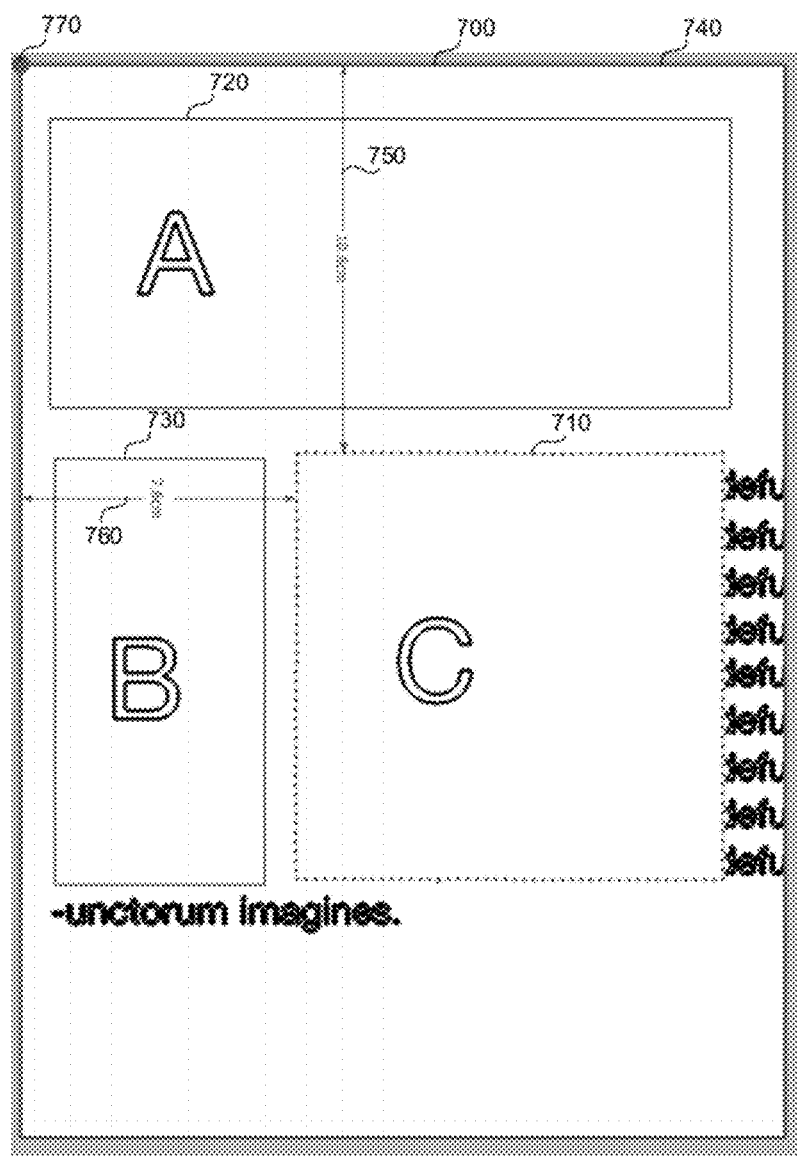
FIG. 7A shows a conventional representation of a document that includes an absolute-positioned element.

Absolute—FIG. 7A shows a conventional representation of a document 700 that includes an absolute-positioned element 710. Recall that an absolute-positioned element is positioned relative to a containing block and can define an offset that describes the position of an edge of the element with respect to an edge of the containing block. In FIG. 7A, the containing block is the page itself. FIG. 7A shows the containing block 740 of element 710 and the top-edge offset 750 (here, 10.8 cm down) and left-edge offset 760 (here, 7.6 cm right) used to position the element 710. FIG. 7A also shows the upper-left corner 770 of the containing block 740, which is used as the origin (0,0) when measuring a vertical offset or horizontal offset. Note that different origin locations and coordinate systems can be used in conjunction with the offsets.

Element 720 is positioned starting at the upper left corner. Since element 720 fills that line, the next element (730) is positioned below element 720 and flush left. Next, element 710 is positioned based on the containing block 740 and the offsets 750, 760. Finally, the text is placed to the right of element 730, where it fills that line and starts a new line below element 730, flush left.

In FIGS. 4A, 5A, and 6A, the text was positioned along the bottom of elements 410, 510, and 610, respectively. Since elements 410, 510, and 610 were associated with NOPS, they did not overlap the text. In FIG. 7A, element 710 is absolute-positioned and thus can occupy the same 2D page position as the text.

Figure 7B:
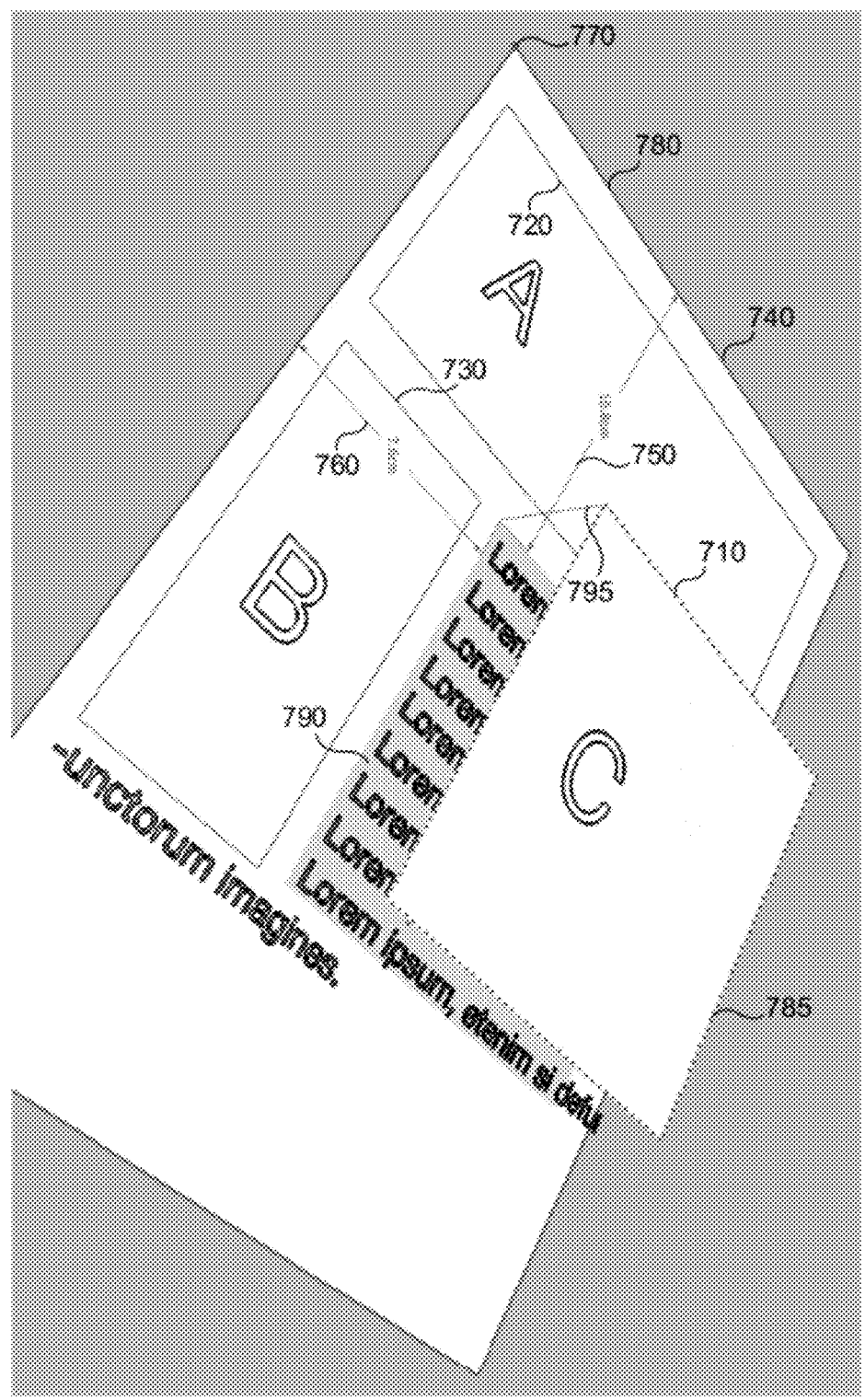
FIG. 7B shows a layered representation of the document shown in FIG. 7A, according to one embodiment of the invention.

FIG. 7B shows a layered representation of the document shown in FIG. 7A, according to one embodiment of the invention. FIG. 7B includes two layers 780, 785. The initial layer 780 includes elements that are associated with a NOPS. In FIG. 7B, the layer 780 includes elements 720 and 730 (because they are flow-positioned). The second layer 785 includes elements that are associated with an OPS. In FIG. 7B, the second layer 785 includes element 710 (because it is absolute-positioned). To simplify the presentation of the two layers, the second layer 785 is represented by element 710, which is the only element that is included in the second layer 785.

FIG. 7B also shows a rectangle 790 (partially obscured by element 710) which will be referred to as a placeholder. A placeholder indicates a 2D area on a lower layer that will be overlapped by an element on a higher layer when a document is viewed with a conventional representation. In FIG. 7B, the placeholder 790 indicates a 2D area on the initial layer 780 that will be overlapped by element 710, which is located in the second layer 785. Note that in FIG. 7B, the placeholder 790 overlaps some of the text. This means that element 710 will overlap some of the text when the document is viewed with a conventional representation (e.g., as shown in FIG. 7A).

In one embodiment, a placeholder has the same shape and size as the element it represents (in FIG. 7B, element 710), modified to indicate the 3D perspective. In FIG. 7B, the placeholder 790 is shown in gray as if it were a shadow cast upon the initial layer 780 by element 710, which is located in the second layer 785.

In other embodiments (not shown), a placeholder can be shown in other ways. For example, a placeholder can look like its associated element except that the placeholder has a different opacity (e.g., the placeholder is semitransparent so that any overlapped elements can still be seen). As another example, the placeholder can be represented by a symbol such as an anchor, a cross, crosshairs, or a pin.

FIG. 7B also shows a line 795 that connects the upper-left corner of element 710 with the placeholder 790 and which will be referred to as a cross-layer connection. A cross-layer connection indicates a correspondence between a placeholder on a lower layer and an element on a higher layer. In FIG. 7B, the cross-layer connection 795 indicates a correspondence between the placeholder 790 on the initial layer 780 and element 710 in the second layer 785.

In other embodiments (not shown), a cross-layer connection can be shown in other ways where a line 795 is not necessary. For example, if a placeholder is selected, the corresponding element can be visually indicated (and vice versa—if an element is selected, the corresponding placeholder can be visually indicated). As another example, if a cursor hovers within a placeholder, the corresponding element can be visually indicated (and vice versa—if a cursor hovers within an element, the corresponding placeholder can be visually indicated). Visual indication of an object can include, for example, highlighting the object, changing a color of the object, animating the object (e.g., so that the object appears to shake or quiver), or surrounding the object with a shape (e.g., an oval).

Figure 8A:
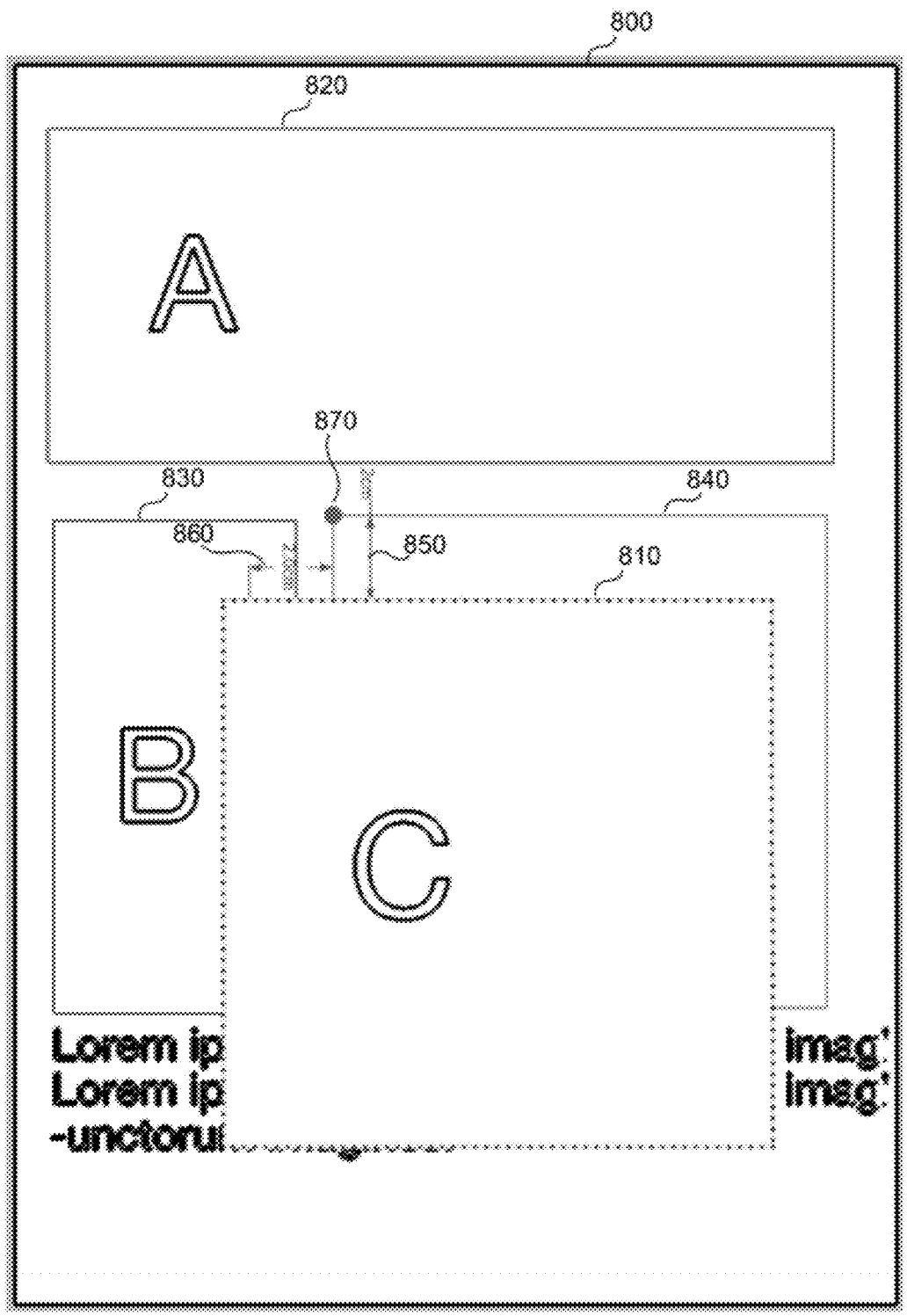
FIG. 8A shows a conventional representation of a document that includes a relative-positioned element.

Relative—FIG. 8A shows a conventional representation of a document 800 that includes a relative-positioned element 810. Elements 820 and 830 are flow-positioned. Recall that a relative-positioned element is initially positioned according to the flow positioning scheme to determine a temporary position and then moved from the temporary position to a final position using offsets. Also, a relative-positioned element occupies space at its temporary position. FIG. 8A shows the temporary position 840 of element 810 and the top-edge offset 850 (here, 2 cm down) and left-edge offset 860 (here, 2 cm left) used to move element 810 to its final position. FIG. 8A also shows the upper-left corner 870 of the temporary position 840, which is used as the origin (0,0) when measuring a vertical offset or horizontal offset.

In FIGS. 4A, 5A, and 6A, there was text present along the bottom of elements 410, 510, and 610, respectively. Since elements 410, 510, and 610 were associated with NOPS, they did not overlap the text. In FIG. 8A, element 810 is relative-positioned. Since the temporary position 840 of element 810 occupies space, the text is pushed down along the bottom of temporary position 840. Due to the non-zero offsets 850, 860, element 810 has moved from its temporary position 840 and now overlaps some of the text.

Figure 8B:
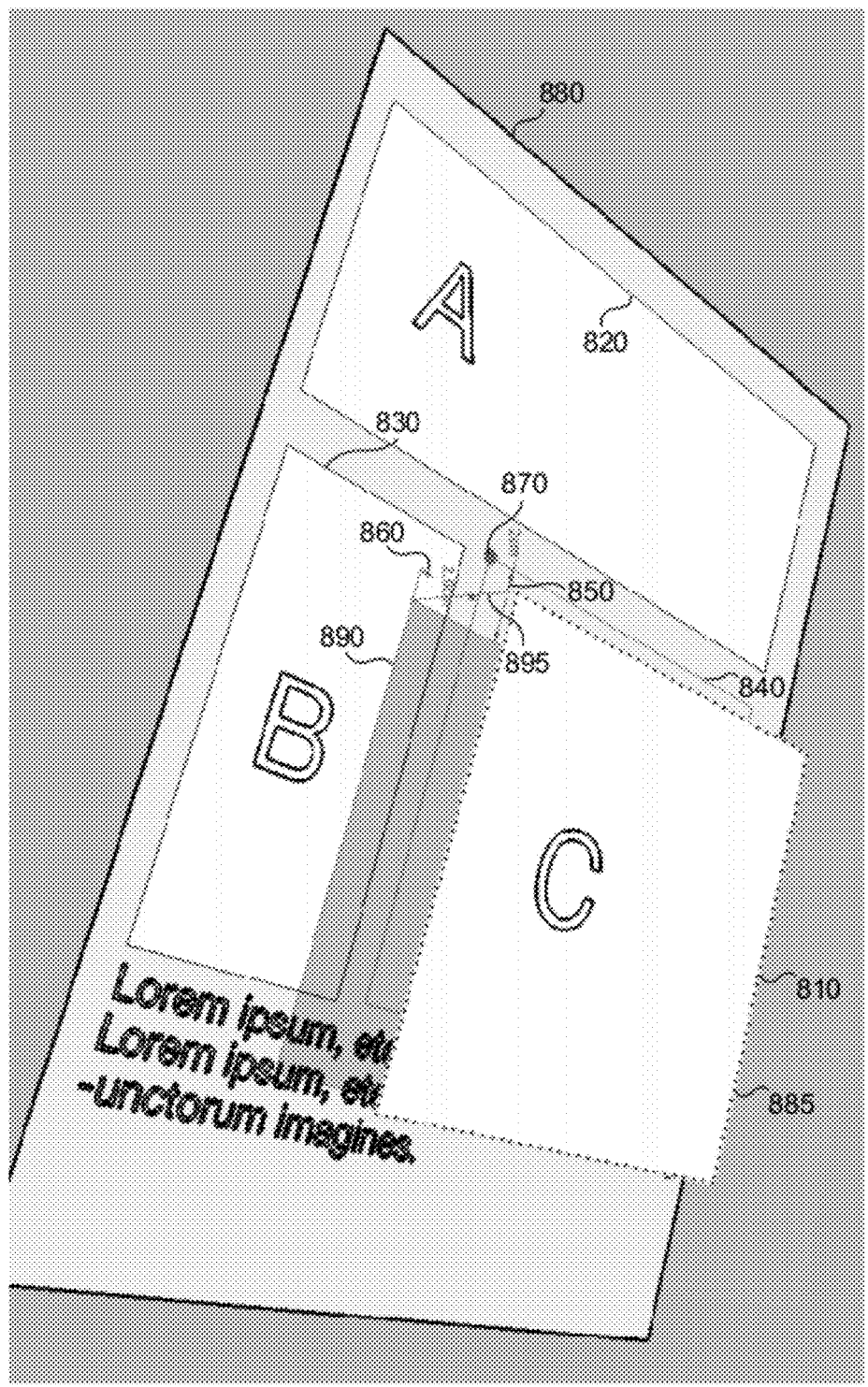
FIG. 8B shows a layered representation of the document shown in FIG. 8A, according to one embodiment of the invention.

FIG. 8B shows a layered representation of the document shown in FIG. 8A, according to one embodiment of the invention. FIG. 8B includes two layers 880, 885. The initial layer 880 includes elements that are associated with a NOPS. In FIG. 8B, the layer 880 includes elements 820 and 830 (because they are flow-positioned). The second layer 885 includes elements that are associated with an OPS. In FIG. 8B, the second layer 885 includes element 810 (because it is relative-positioned). To simplify the presentation of the two layers, the second layer 885 is represented by element 810, which is the only element that is included in the second layer 885.

FIG. 8B also shows a rectangle 890 (partially obscured by element 810) which will be referred to as a placeholder. A placeholder indicates a 2D area on a lower layer that will be overlapped by an element on a higher layer when a document is viewed with a conventional representation. In FIG. 8B, the placeholder 890 indicates a 2D area on the initial layer 880 that will be overlapped by element 810, which is located in the second layer 885. Note that in FIG. 8B, the placeholder 890 overlaps some of the text. This means that element 810 will overlap some of the text when the document is viewed with a conventional representation (e.g., as shown in FIG. 8A).

In one embodiment, a placeholder has the same shape and size as the element it represents (in FIG. 8B, element 810), modified to indicate the 3D perspective. In FIG. 8B, the placeholder 890 is shown in gray as if it were a shadow cast upon the initial layer 880 by element 810, which is located in the second layer 885.

In other embodiments (not shown), a placeholder can be shown in other ways. For example, a placeholder can look like its associated element except that the placeholder has a different opacity (e.g., the placeholder is semitransparent so that any overlapped elements can still be seen). As another example, the placeholder can be represented by a symbol such as an anchor, a cross, crosshairs, or a pin.

FIG. 8B also shows a line 895 that connects the upper-left corner of element 810 with the placeholder 890 and which will be referred to as a cross-layer connection. A cross-layer connection indicates a correspondence between a placeholder on a lower layer and an element on a higher layer. In FIG. 8B, the cross-layer connection 895 indicates a correspondence between the placeholder 890 on the initial layer 880 and element 810 in the second layer 885.

In other embodiments (not shown), a cross-layer connection can be shown in other ways where a line 895 is not necessary. For example, if a placeholder is selected, the corresponding element can be visually indicated (and vice versa—if an element is selected, the corresponding placeholder can be visually indicated). As another example, if a cursor hovers within a placeholder, the corresponding element can be visually indicated (and vice versa—if a cursor hovers within an element, the corresponding placeholder can be visually indicated). Visual indication of an object can include, for example, highlighting the object, changing a color of the object, animating the object (e.g., so that the object appears to shake or quiver), or surrounding the object with a shape (e.g., an oval).

Additional Examples of Layered Representations

Figure 9:
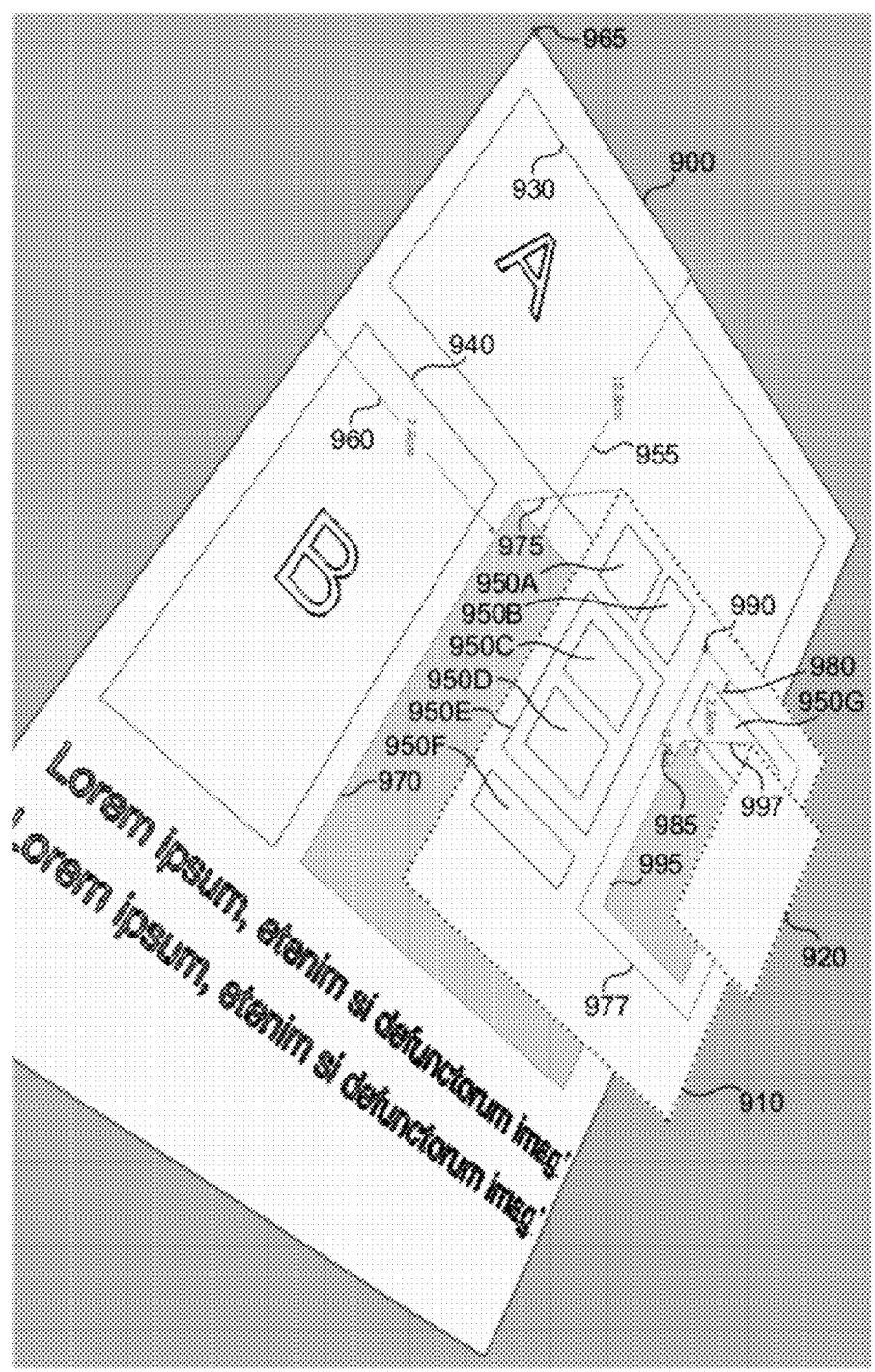
FIG. 9 shows a layered representation of a document that includes more than two layers, according to one embodiment of the invention.

FIG. 9 shows a layered representation of a document that includes more than two layers, according to one embodiment of the invention. In FIG. 9, the layered representation of the document includes three layers. The first layer 900 includes element 930 (labeled "A"), element 940 (labeled "B"), and text. Elements 930 and 940 and the text are flow-positioned, which is a non-overlapping positioning scheme (NOPS).

The second layer includes element 910. Element 910 is absolute-positioned. Since absolute positioning is an overlapping positioning scheme (OPS), element 910 is shown in an incrementally higher layer (in comparison to elements 930 and 940, which are shown in an incrementally lower layer). The containing block of element 910 is the entire page. Element 910 is positioned relative to its containing block using a top-edge offset 955 of 10.8 cm and a left-edge offset 960 of 7.6 cm. The offsets 955, 960 are specified relative to the origin 965, which is defined as the upper-left corner of the containing block. FIG. 9 also shows the placeholder 970 associated with element 910 and the cross-layer connection 975 that connects the placeholder 970 in the first layer 900 with element 910 in the second layer.

Element 910 includes elements 950A, 950B, 950C, 950D, 950E, 950F, 950G, and 920. Elements 950A, 950B, 950C, 950D, 950E, 950F, and 950G are flow-positioned, which is a non-overlapping positioning scheme (NOPS). Note that although these elements are flow-positioned, they are not shown on the first layer 900. These elements are shown on the second layer because they are contained within an element (element 910) that is associated with an overlapping positioning scheme (OPS). Thus, elements 950A, 950B, 950C, 950D, 950E, 950F, and 950G can overlap elements that are shown in the first layer.

Element 910 also includes element 920. Element 920 is absolute-positioned. Since absolute positioning is an overlapping positioning scheme (OPS), element 920 is shown in an incrementally higher layer (in comparison to elements 950A, 950B, 950C, 950D, 950E, 950F, and 950G, which are shown in an incrementally lower layer). Specifically, element 920 is shown in a third layer. The containing block of element 920 is the rectangle 977. Element 920 is positioned relative to its containing block using a top-edge offset 980 of 2.6 cm and a left-edge offset 985 of 0.7 cm. The offsets 980, 985 are specified relative to the origin 990, which is defined as the upper-left corner of the containing block. FIG. 9 also shows the placeholder 995 associated with element 920 and the cross-layer connection 997 that connects the placeholder 995 in the second layer with element 920 in the third layer.

Figure 10:
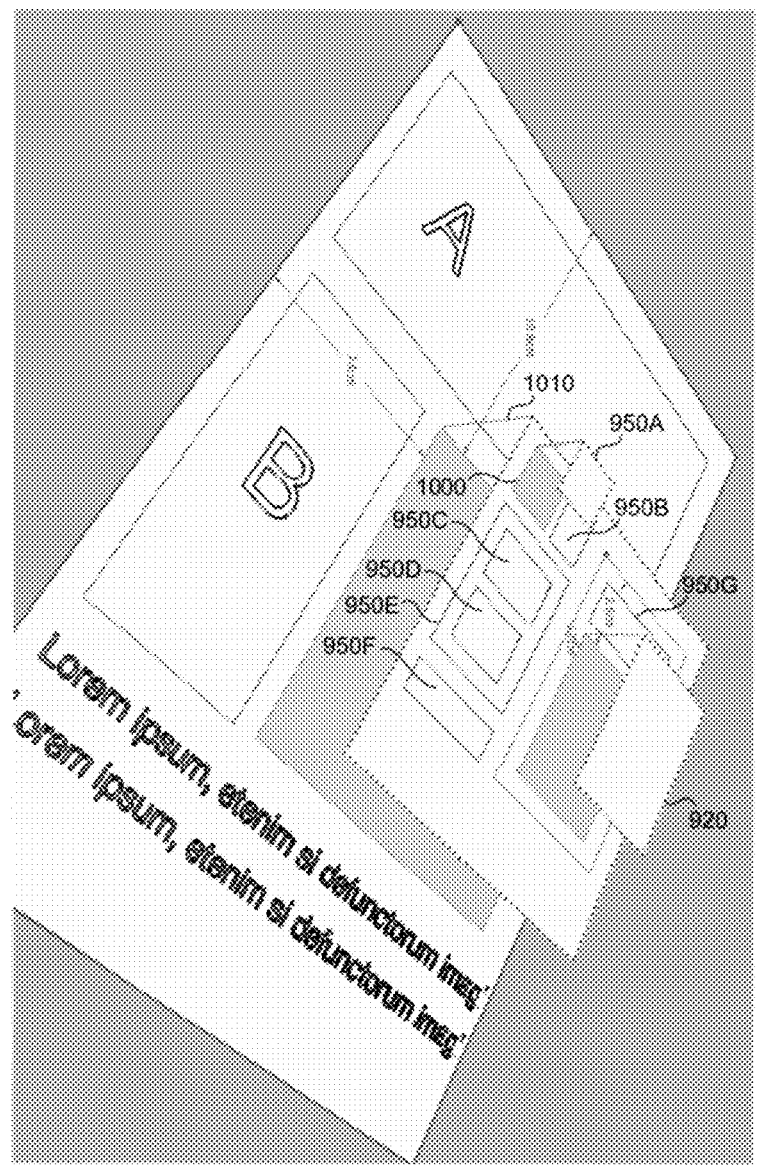
FIG. 10 shows a layered representation of a document that includes more than one element in an upper layer, according to one embodiment of the invention.

FIG. 10 shows a layered representation of a document that includes more than one element in an upper layer, according to one embodiment of the invention. FIG. 10 is similar to FIG. 9 in that both show layered representations of documents that include three layers. However, in FIG. 9, element 950A was associated with a non-overlapping positioning scheme (NOPS). In FIG. 10, element 950A is associated with an overlapping positioning scheme (OPS). As a result, element 950A is shown in an incrementally higher layer (in comparison to elements 950B, 950C, 950D, 950E, 950F, and 950G, which are shown in an incrementally lower layer). Specifically, element 950A is shown in a third layer. Thus, in FIG. 10, the third layer includes two elements—element 920 and element 950A. Note that the third layer shows both element 920 and element 950A, even though the elements do not necessarily have the same containing block. FIG. 10 also shows the placeholder 1000 associated with element 950A and the cross-layer connection 1010 that connects the placeholder 1000 in the second layer with element 950A in the third layer.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a tangible computer-readable (or machine-readable) storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description. In addition, the present invention is not described with reference to any particular programming language. It will be appreciated that a variety of programming languages may be used to implement the teachings of the present invention as described herein, and any references to specific languages are provided for disclosure of enablement and best mode of the present invention.

As will be understood by those familiar with the art, the invention may be embodied in other specific forms without departing from the spirit or essential characteristics thereof. Likewise, the particular naming and division of the modules, features, attributes, methodologies, managers and other aspects are not mandatory or significant, and the mechanisms that implement the invention or its features may have different names, divisions and/or formats. Furthermore, as will be apparent to one of ordinary skill in the relevant art, the modules, features, attributes, methodologies, managers and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

In addition, the language used in the specification has been principally selected for readability and instructional purposes and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for displaying a document, the document comprising logically nested elements, wherein a first element and a second element are logically nested within a third parent element, such that the first element and the second element are sibling content elements, and wherein a fourth element is logically nested within the second element, and wherein the first element is positioned on a page according to a non-overlapping positioning scheme, the method comprising:
    displaying the first element in a first two-dimensional layer;
    responsive to the second element being positioned on the page according to a non-overlapping positioning scheme:
        displaying the second element in the first two-dimensional layer;
        responsive to the fourth element being positioned on the page according to a non-overlapping positioning scheme, displaying the fourth element in the first two-dimensional layer; and
        responsive to the fourth element being positioned on the page according to an overlapping positioning scheme, displaying the fourth element in a second two-dimensional layer, wherein the first layer and the second layer are displayed separate from each other in three-dimensional space; and
    responsive to the second element being positioned on the page according to an overlapping positioning scheme:
        displaying the second element in a second two-dimensional layer;
        responsive to the fourth element being positioned on the page according to a non-overlapping positioning scheme, displaying the fourth element in the second two-dimensional layer, wherein the first layer and the second layer are displayed separate from each other in three-dimensional space; and
        responsive to the fourth element being positioned on the page according to an overlapping positioning scheme, displaying the fourth element in a third two-dimensional layer, wherein the first layer and the second layer and the third layer are displayed separate from each other in three-dimensional space.

2. The method of claim 1, further comprising visually indicating, in the first layer, a first area that corresponds to a second area occupied by the second element in the second layer responsive to the second element being positioned on the page according to an overlapping positioning scheme.

3. The method of claim 2, wherein visually indicating the first area comprises displaying a shape that occupies the first area.

4. The method of claim 3, wherein the shape appears shaded.

5. The method of claim 3, wherein the shape looks like the second element but with a different opacity.

6. The method of claim 2, further comprising visually indicating a correspondence between the first area and the second element.

7. The method of claim 6, wherein visually indicating the correspondence between the first area and the second element comprises displaying a line connecting the first area and the second element.

8. The method of claim 6, wherein visually indicating the correspondence between the first area and the second element comprises visually indicating the first area when the second element is selected.

9. The method of claim 6, wherein visually indicating the correspondence between the first area and the second element comprises visually indicating the second element when the first area is selected.

10. The method of claim 6, wherein visually indicating the correspondence between the first area and the second element comprises visually indicating the first area when a cursor hovers within the second element.

11. The method of claim 6, wherein visually indicating the correspondence between the first area and the second element comprises visually indicating the second element when a cursor hovers within the first area.

12. A computer program product for displaying a document, the document comprising logically nested elements, wherein a first element and a second element are logically nested within a third parent element, such that the first element and the second element are sibling content elements, and wherein a fourth element is logically nested within the second element, and wherein the first element is positioned on a page according to a non-overlapping positioning scheme, the computer program product comprising:
 a non-transitory machine-readable storage medium encoded with instructions which, when executed by a processor, cause the processor to perform a method, the method comprising:
  displaying the first element in a first two-dimensional layer;
  responsive to the second element being positioned on the page according to a non-overlapping positioning scheme:
   displaying the second element in the first two-dimensional layer;
   responsive to the fourth element being positioned on the page according to a non-overlapping positioning scheme, displaying the fourth element in the first two-dimensional layer; and
   responsive to the fourth element being positioned on the page according to an overlapping positioning scheme, displaying the fourth element in a second two-dimensional layer, wherein the first layer and the second layer are displayed separate from each other three-dimensional space; and
  responsive to the second element being positioned on the page according to an overlapping positioning scheme:
   displaying the second element in a second two-dimensional layer;
   responsive to the fourth element being positioned on the page according to a non-overlapping positioning scheme, displaying the fourth element in the second two-dimensional layer, wherein the first layer and the second layer are displayed separate from each other three-dimensional space; and
   responsive to the fourth element being positioned on the page according to an overlapping positioning scheme, displaying the fourth element in a third two-dimensional layer, wherein the first layer and the second layer and the third layer are displayed separate from each other in three-dimensional space.

13. A system for displaying a document, the document comprising logically nested elements, wherein a first element and a second element are logically nested within a third parent element, such that the first element and the second element are sibling content elements, and wherein a fourth element is logically nested within the second element, and wherein the first element is positioned on a page according to a non-overlapping positioning scheme, the system comprising:
 a processor configured to perform a method, the method comprising:
  displaying the first element in a first two-dimensional layer;
  responsive to the second element being positioned on the page according to a non-overlapping positioning scheme:
   displaying the second element in the first two-dimensional layer;
   responsive to the fourth element being positioned on the page according to a non-overlapping positioning scheme, displaying the fourth element in the first two-dimensional layer; and
   responsive to the fourth element being positioned on the page according to an overlapping positioning scheme, displaying the fourth element in a second two-dimensional layer, wherein the first layer and the second layer are displayed separate from each other in three-dimensional space; and
  responsive to the second element being positioned on the page according to an overlapping positioning scheme:
   displaying the second element in a second two-dimensional layer;
   responsive to the fourth element being positioned on the page according to a non-overlapping positioning scheme, displaying the fourth element in the second two-dimensional layer, wherein the first layer and the second layer are displayed separate from each other in three-dimensional space; and
   responsive to the fourth element being positioned on the page according to an overlapping positioning scheme, displaying the fourth element in a third two-dimensional layer, wherein the first layer and the second layer and the third layer are displayed separate from each other in three-dimensional space.

14. The method of claim 1, further comprising displaying additional elements in additional two-dimensional layers, wherein all of the two-dimensional layers are displayed separate from each other in three-dimensional space.

15. The computer program product of claim 12, wherein the method further comprises visually indicating, in the first layer, a first area that corresponds to a second area occupied by the second element in the second layer responsive to the second element being positioned on the page according to an overlapping positioning scheme.

16. The computer program product of claim 15, wherein visually indicating the first area comprises displaying a shape that occupies the first area.

17. The computer program product of claim 15, wherein the method further comprises visually indicating a correspondence between the first area and the second element.

18. The system of claim 13, wherein the method further comprises visually indicating, in the first layer, a first area that corresponds to a second area occupied by the second element in the second layer responsive to the second element being positioned on the page according to an overlapping positioning scheme.

19. The system of claim 18, wherein visually indicating the first area comprises displaying a shape that occupies the first area.

20. The system of claim 18, wherein the method further comprises visually indicating a correspondence between the first area and the second element.

* * * * *

UNITED STATES PATENT AND TRADEMARK OFFICE
CERTIFICATE OF CORRECTION

PATENT NO. : 8,321,783 B2
APPLICATION NO. : 12/241289
DATED : November 27, 2012
INVENTOR(S) : Dimitri Dupuis-Latour et al.

It is certified that error appears in the above-identified patent and that said Letters Patent is hereby corrected as shown below:

In Column 16, Line 18, In Claim 1, delete "laver" and insert -- layer --, therefor.

In Column 17, Line 36, In Claim 12, delete "other" and insert -- other in --, therefor.

In Column 17, Line 46, In Claim 12, delete "other" and insert -- other in --, therefor.

Signed and Sealed this
Twelfth Day of March, 2013

Teresa Stanek Rea
*Acting Director of the United States Patent and Trademark Office*